April 1, 1924.
J. S. DUNCAN
AUDITING MACHINE
Filed Feb. 3, 1921
1,488,667
15 Sheets-Sheet 2
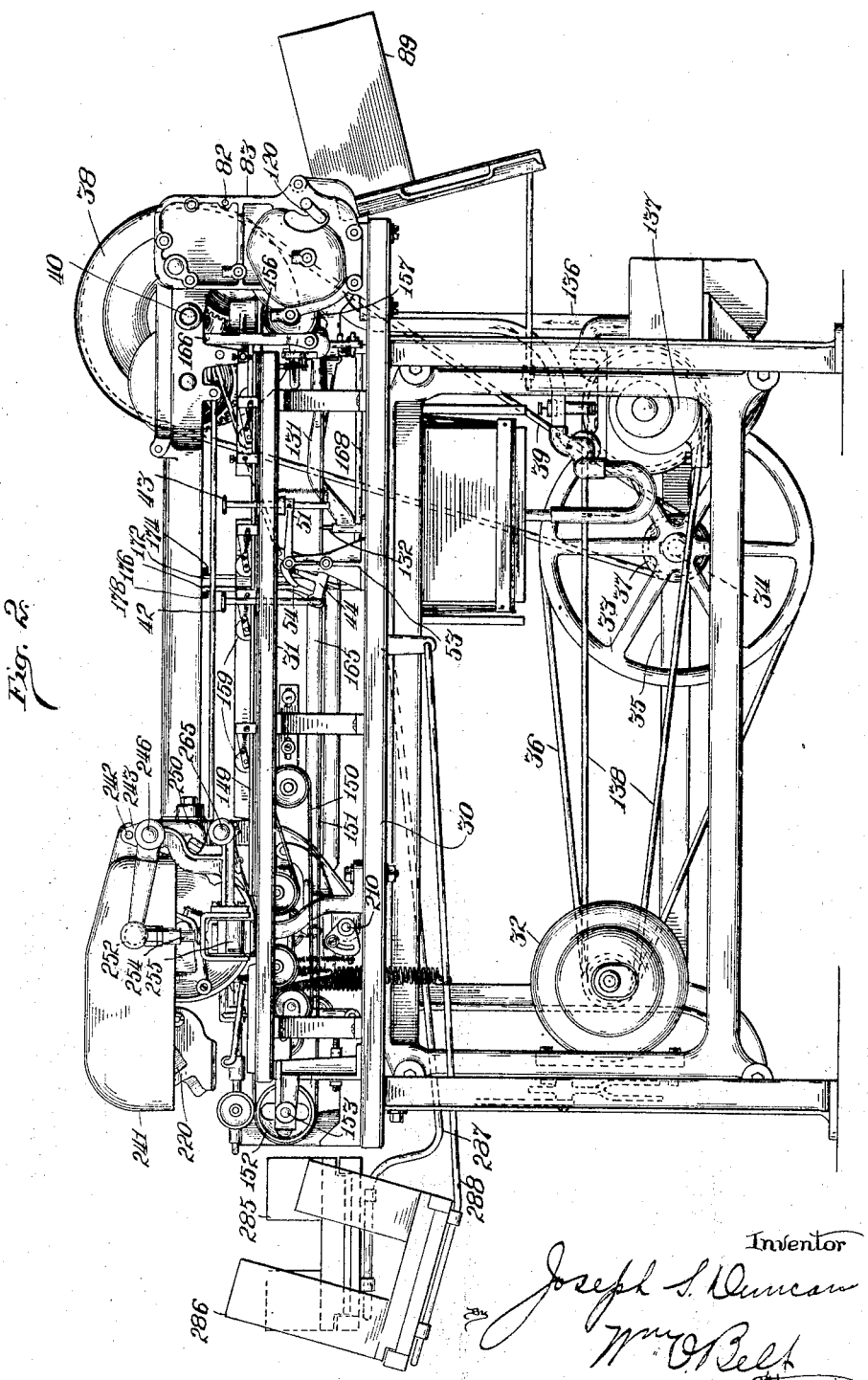

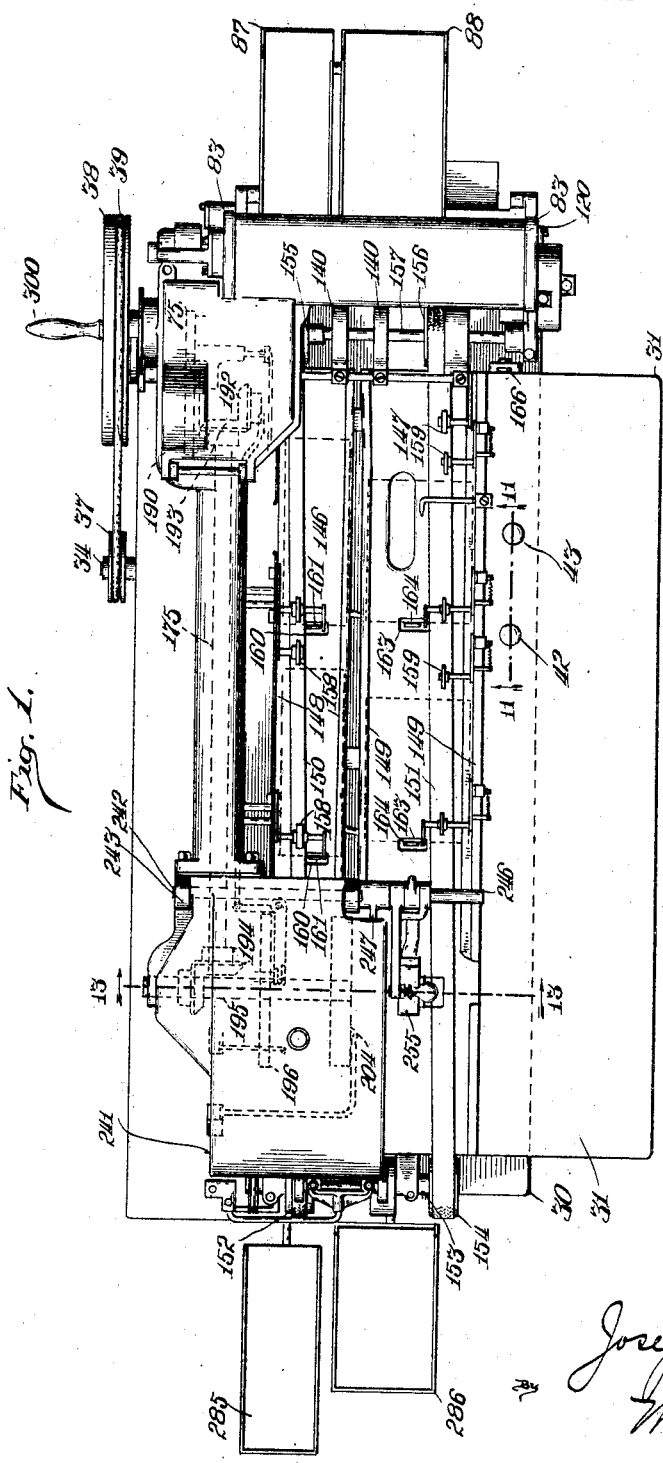

April 1, 1924.
J. S. DUNCAN
1,488,667
AUDITING MACHINE
Filed Feb. 3, 1921      15 Sheets-Sheet 3
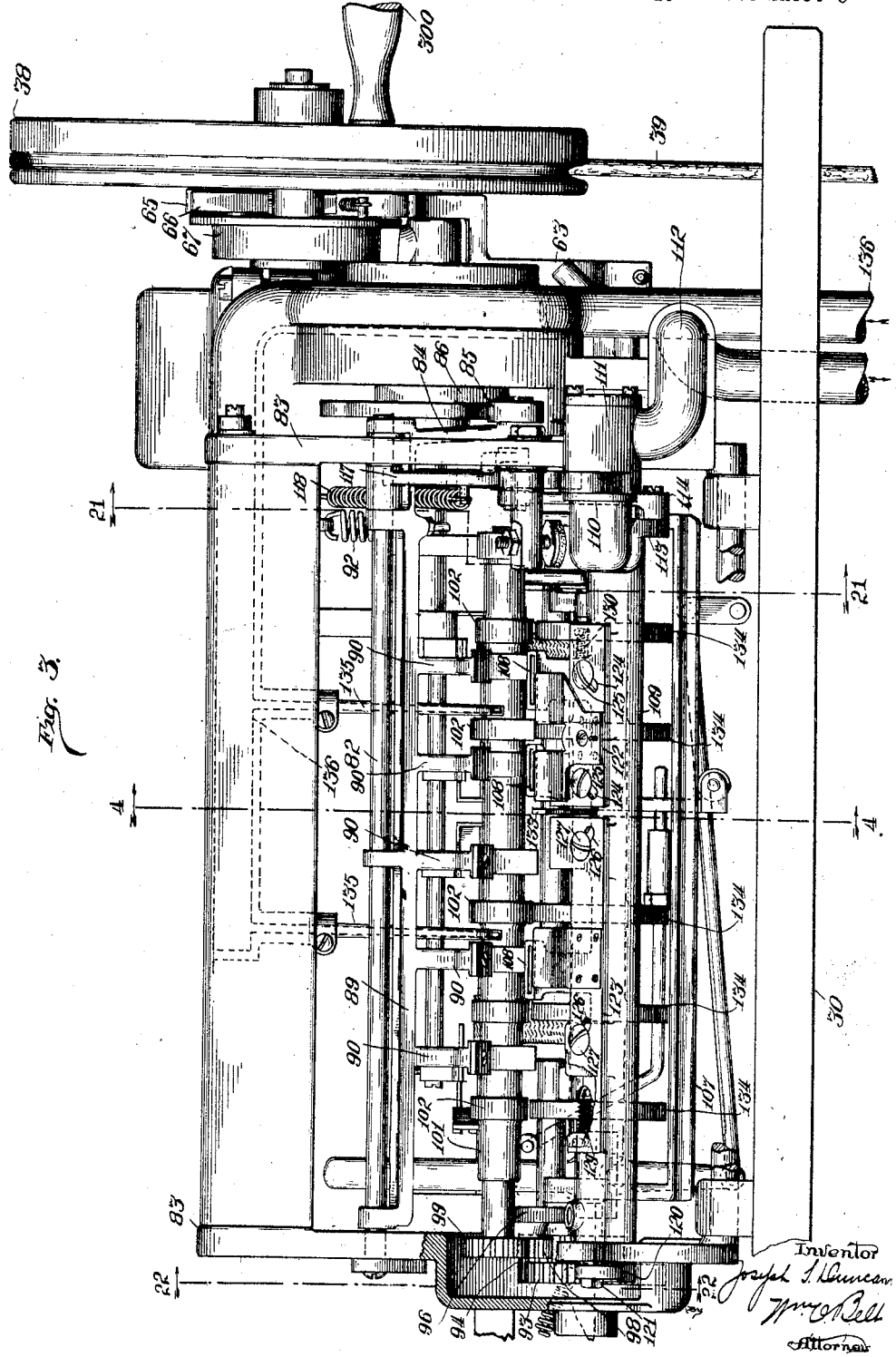

April 1, 1924.
J. S. DUNCAN
1,488,667
AUDITING MACHINE
Filed Feb. 3, 1921 15 Sheets-Sheet 4
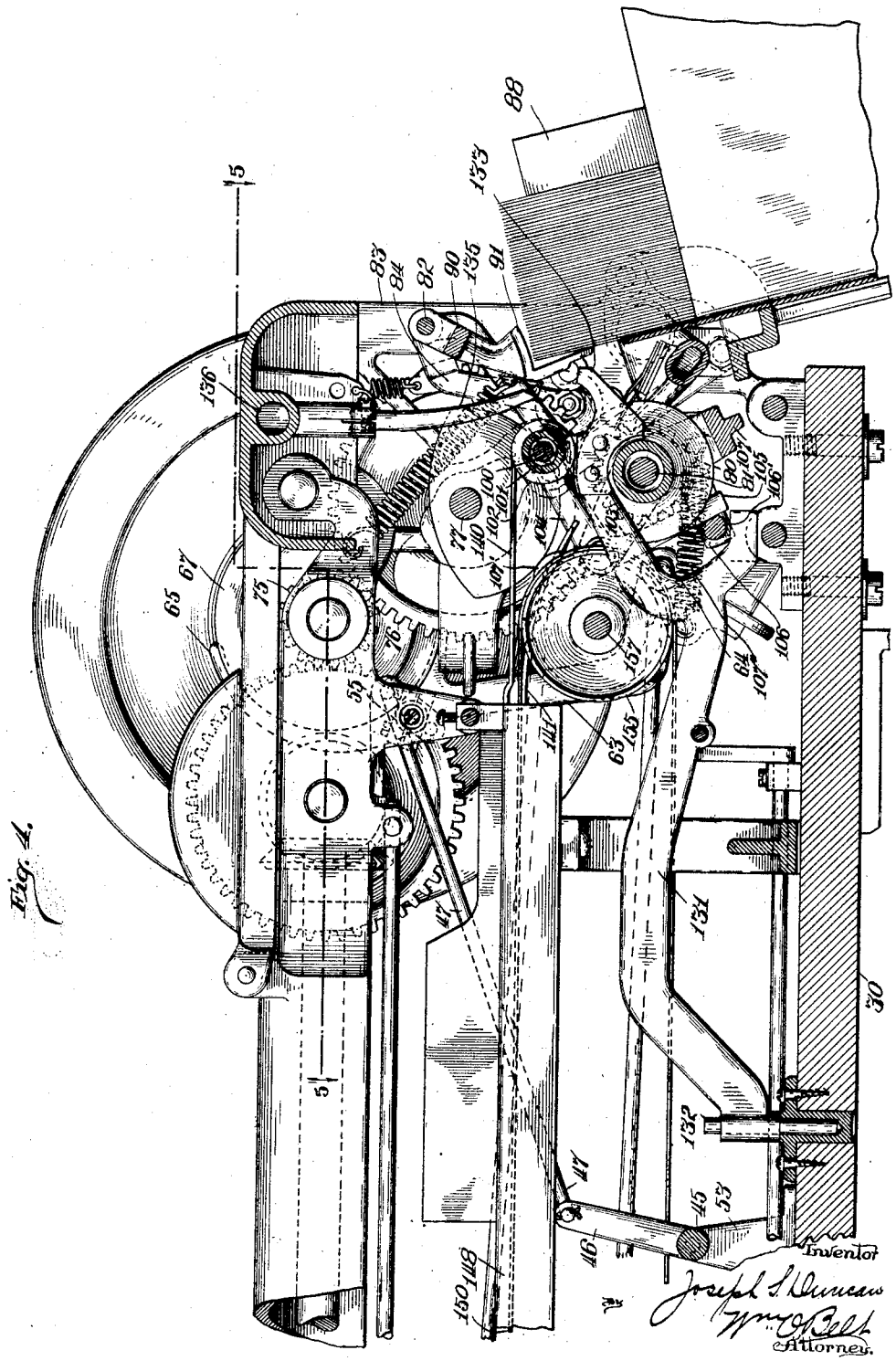

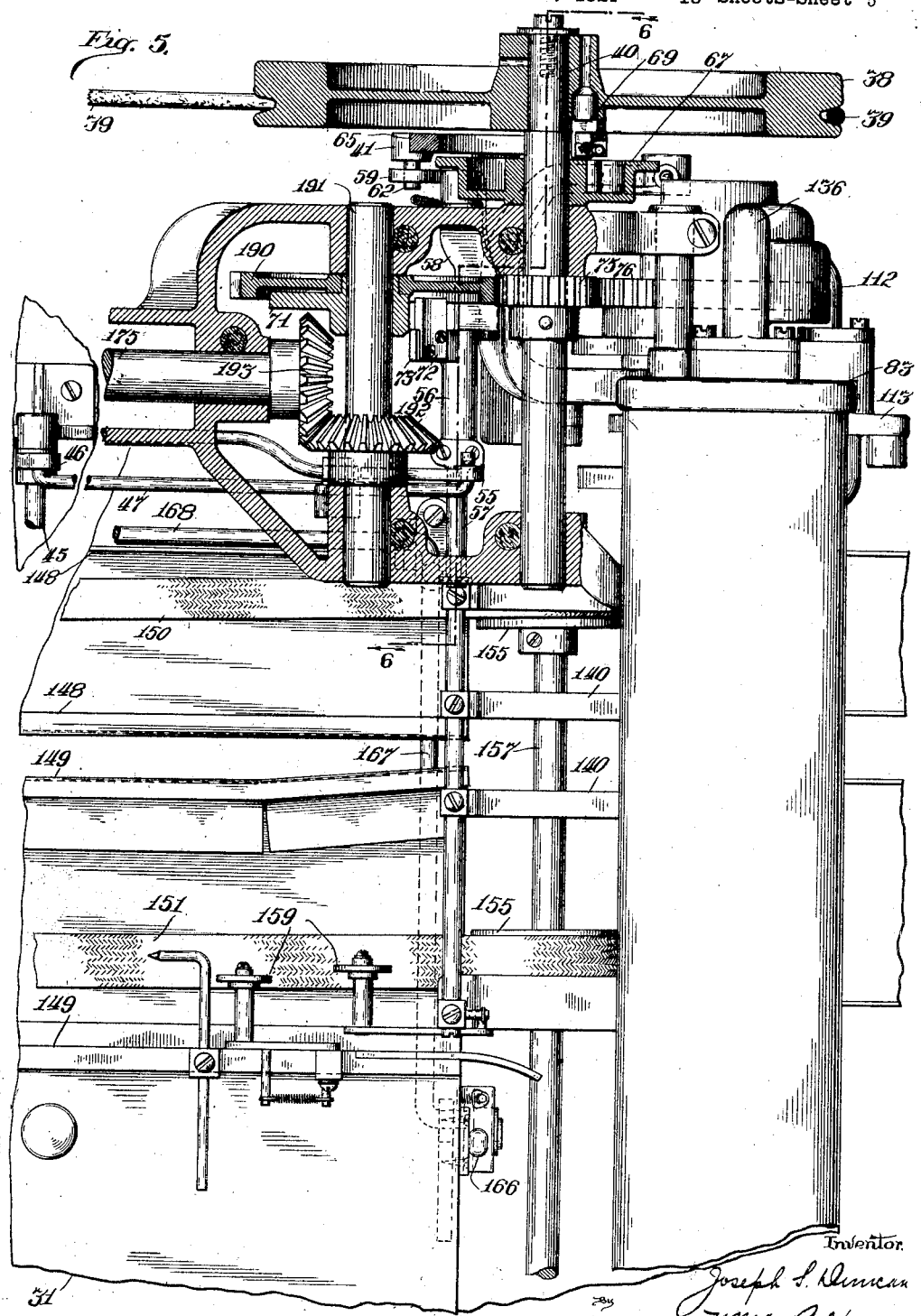

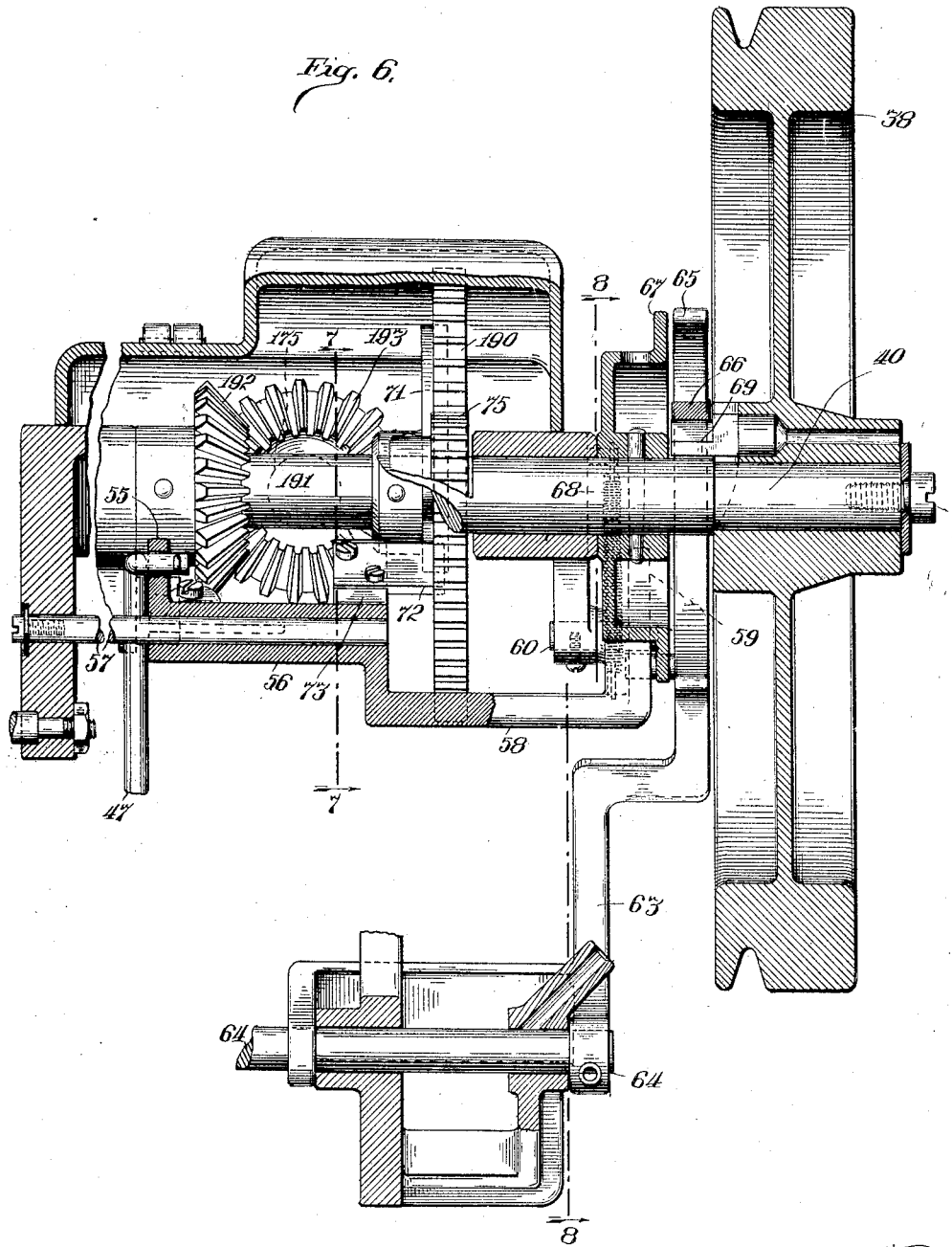

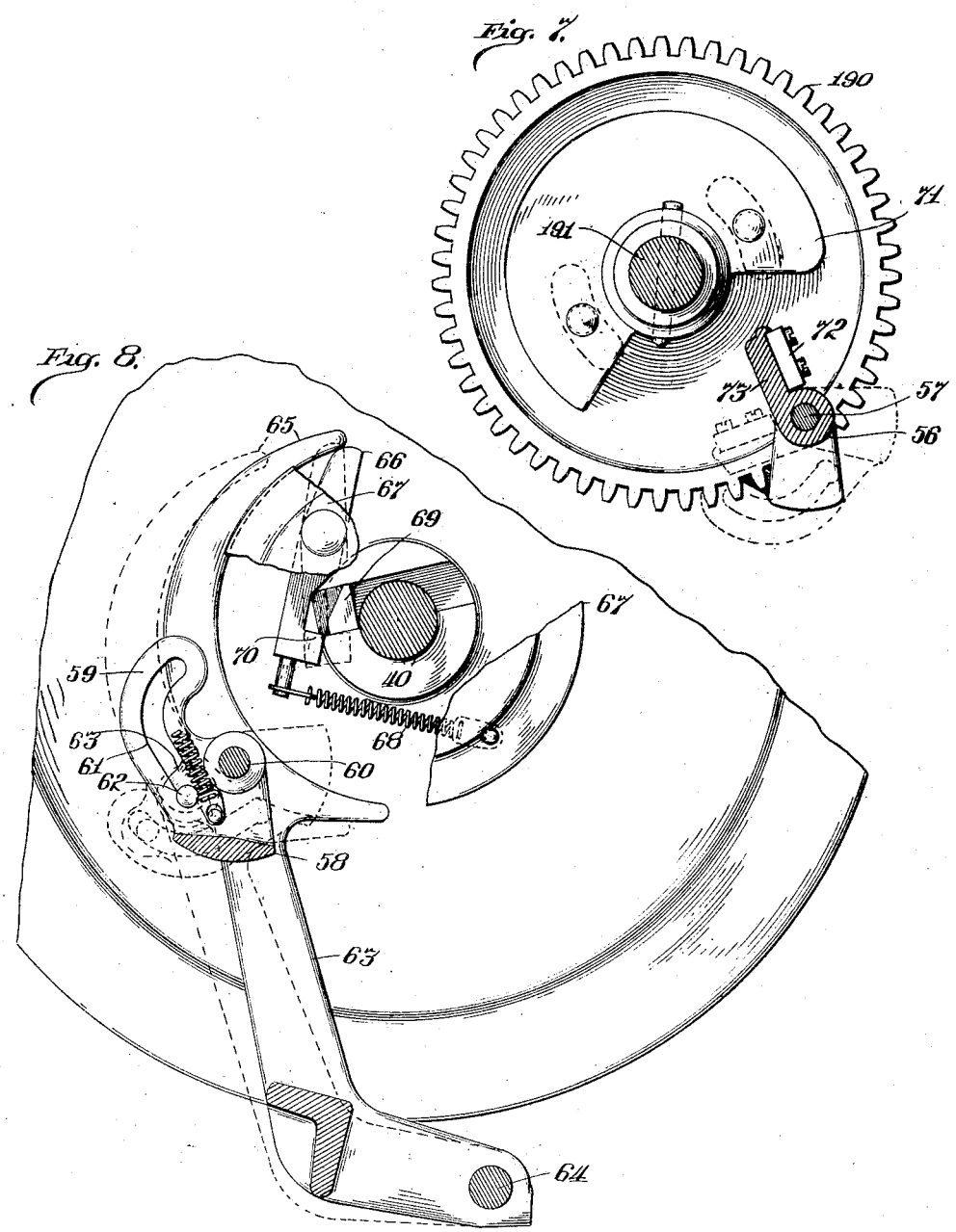

April 1, 1924.
J. S. DUNCAN
AUDITING MACHINE
Filed Feb. 3, 1921
1,488,667
15 Sheets-Sheet 8
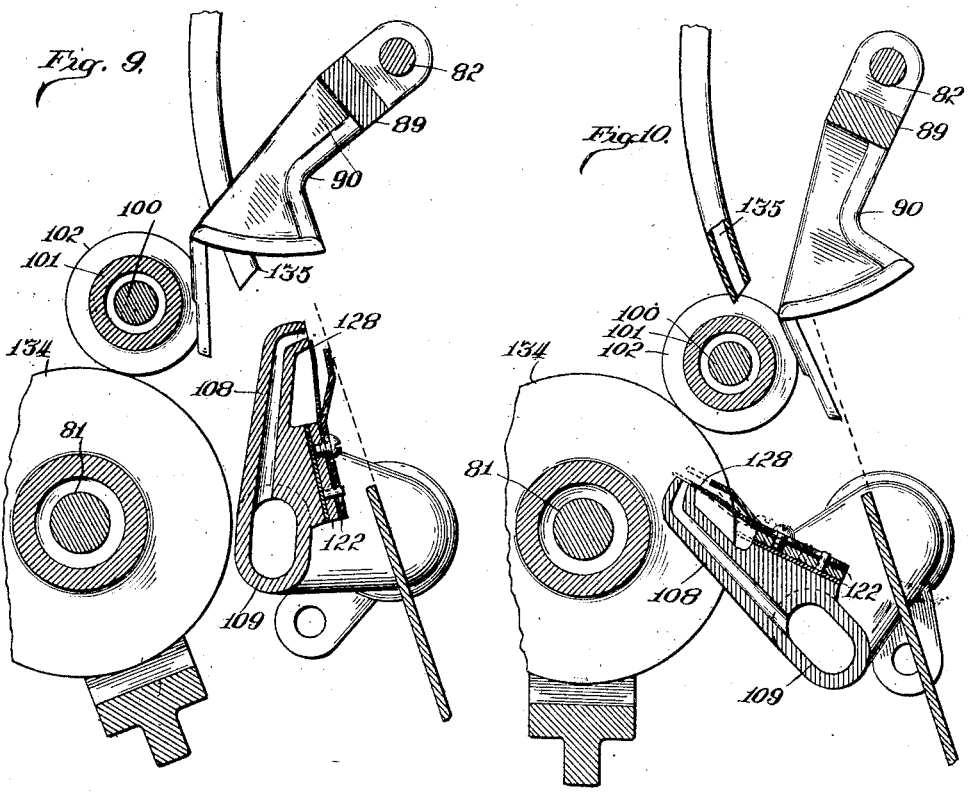
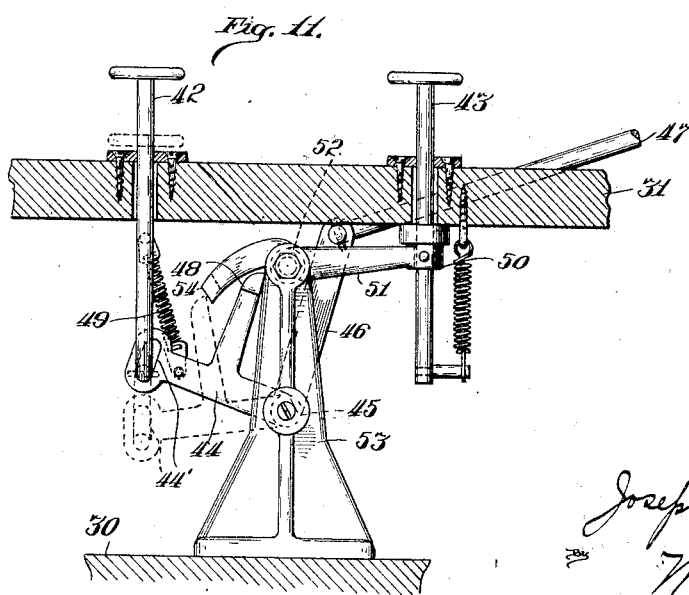
Inventor
Joseph S. Duncan
Wm O Bell
Attorney

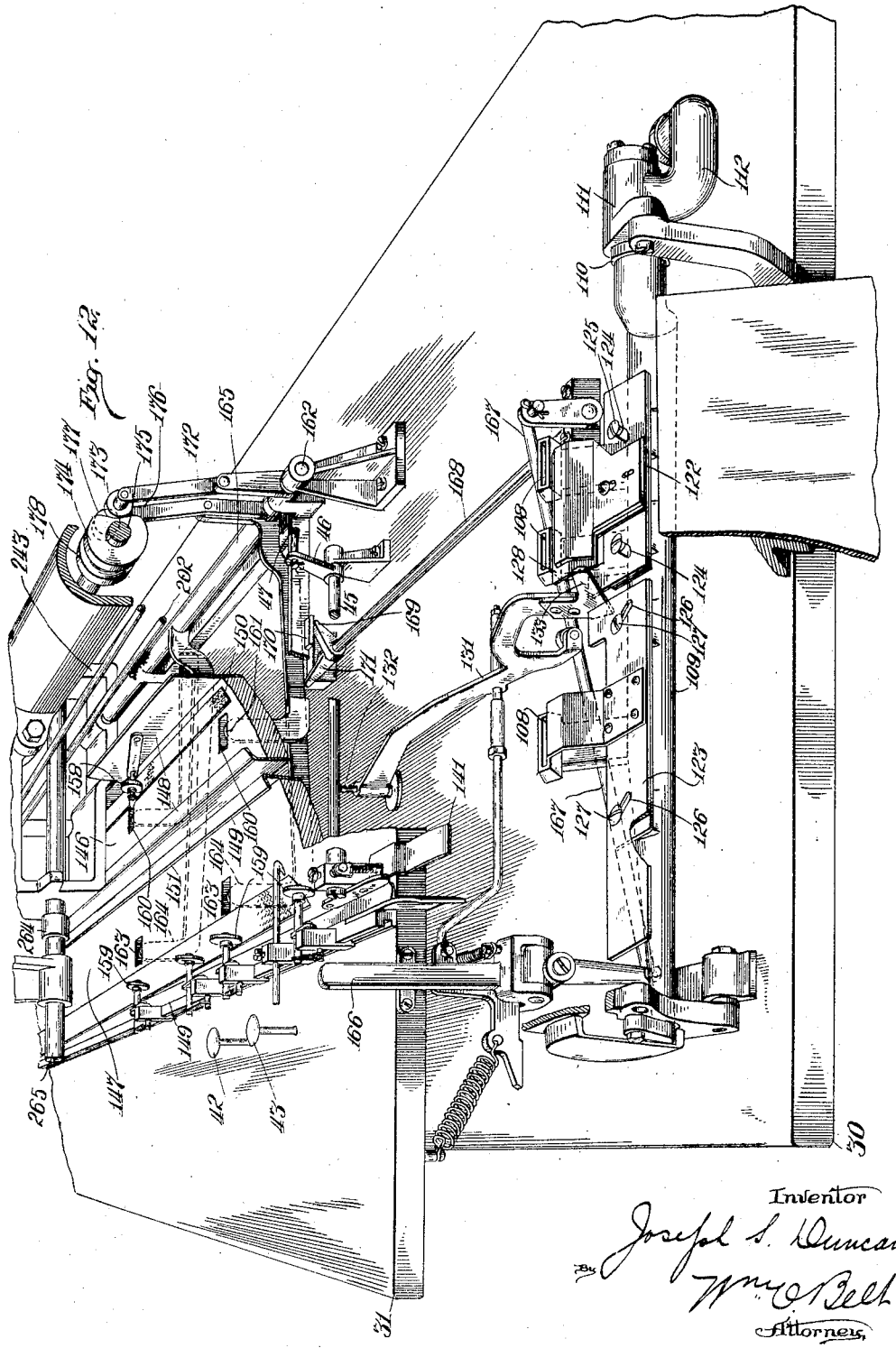

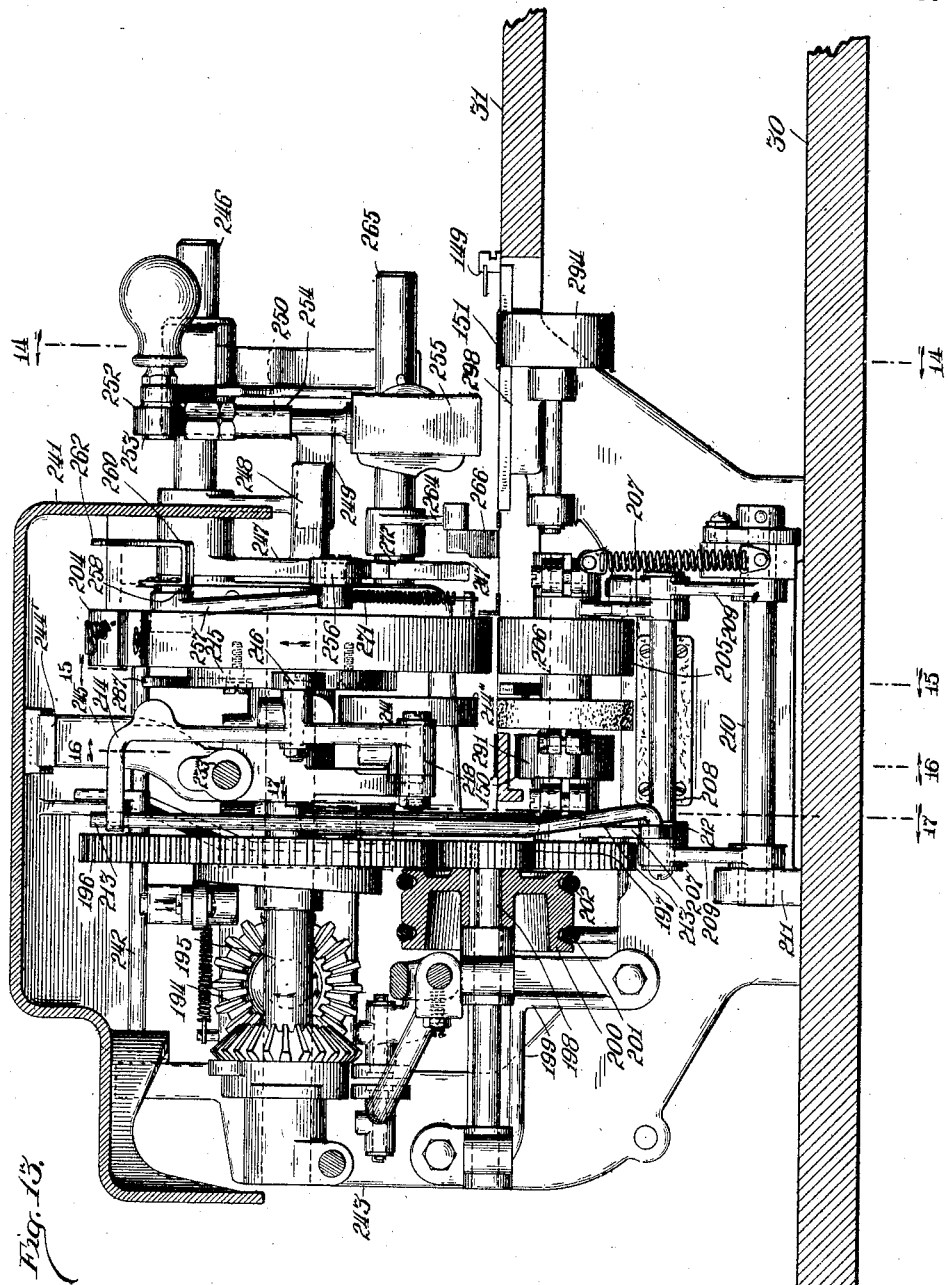

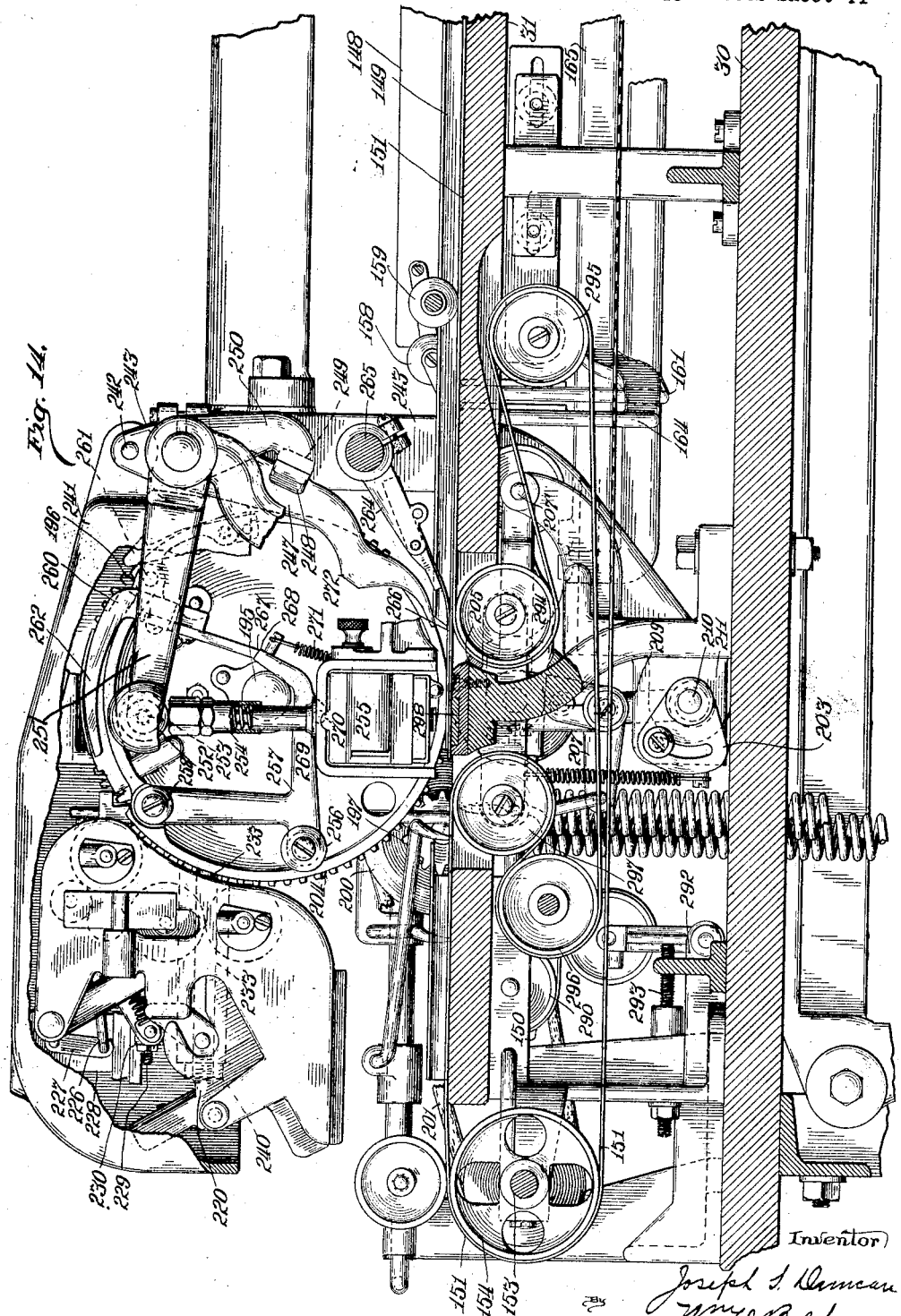

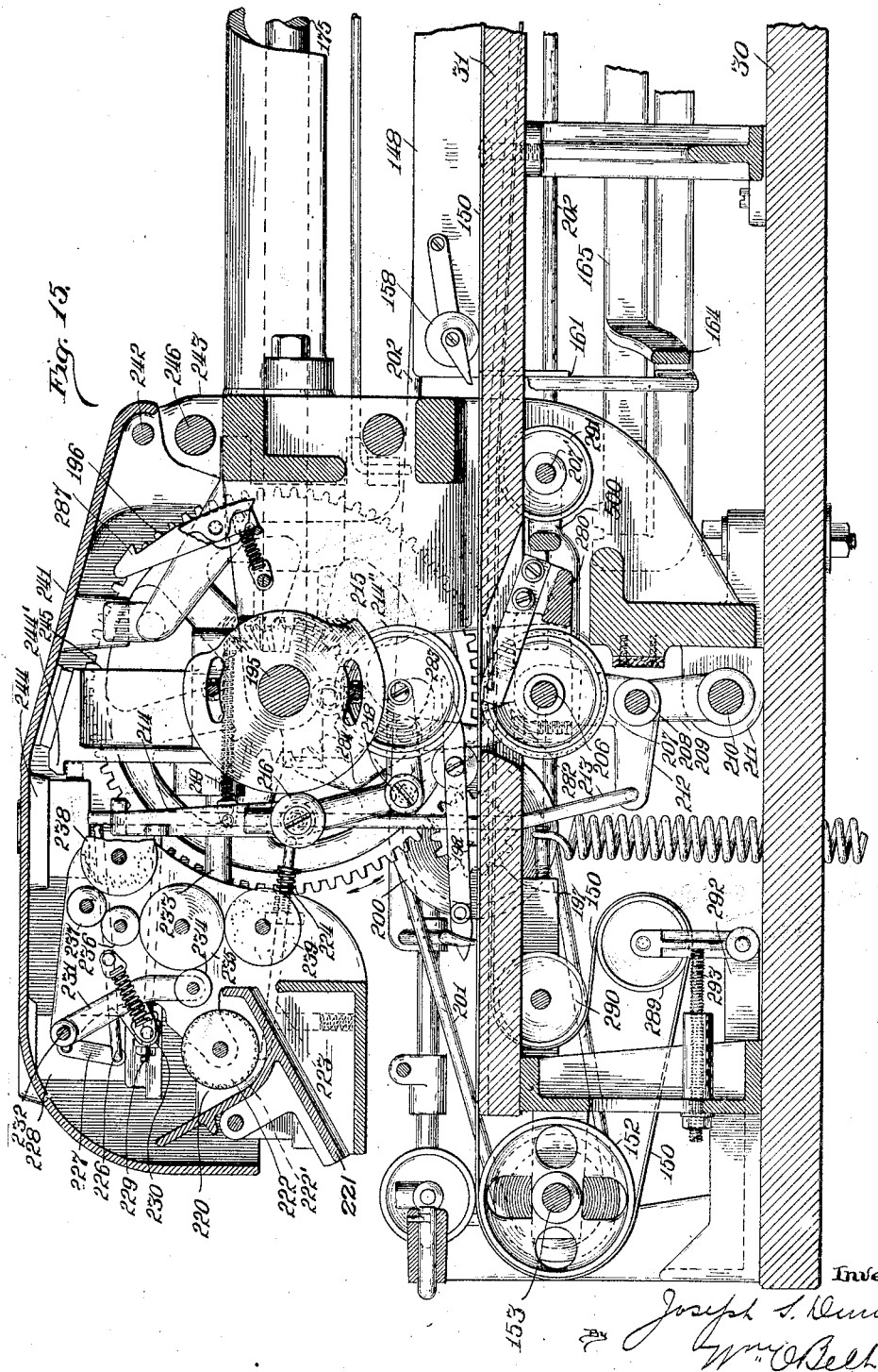

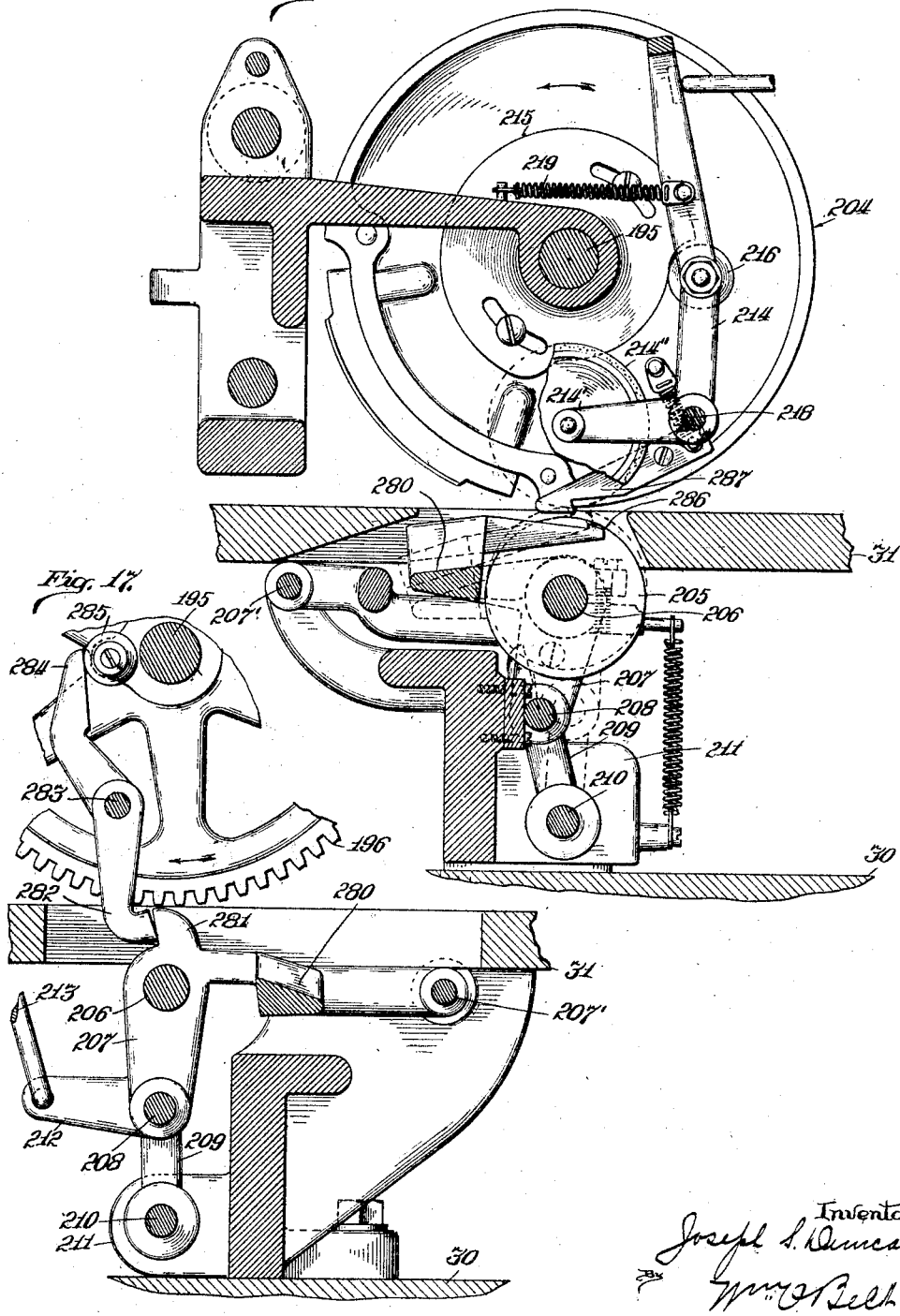

April 1, 1924.

J. S. DUNCAN

AUDITING MACHINE

Filed Feb. 3, 1921    15 Sheets-Sheet 14

1,488,667

Inventor
Joseph S. Duncan
by Wm. C. Bell
Attorney.

April 1, 1924.  
J. S. DUNCAN  
AUDITING MACHINE  
Filed Feb. 3, 1921 15 Sheets-Sheet 15  
1,488,667
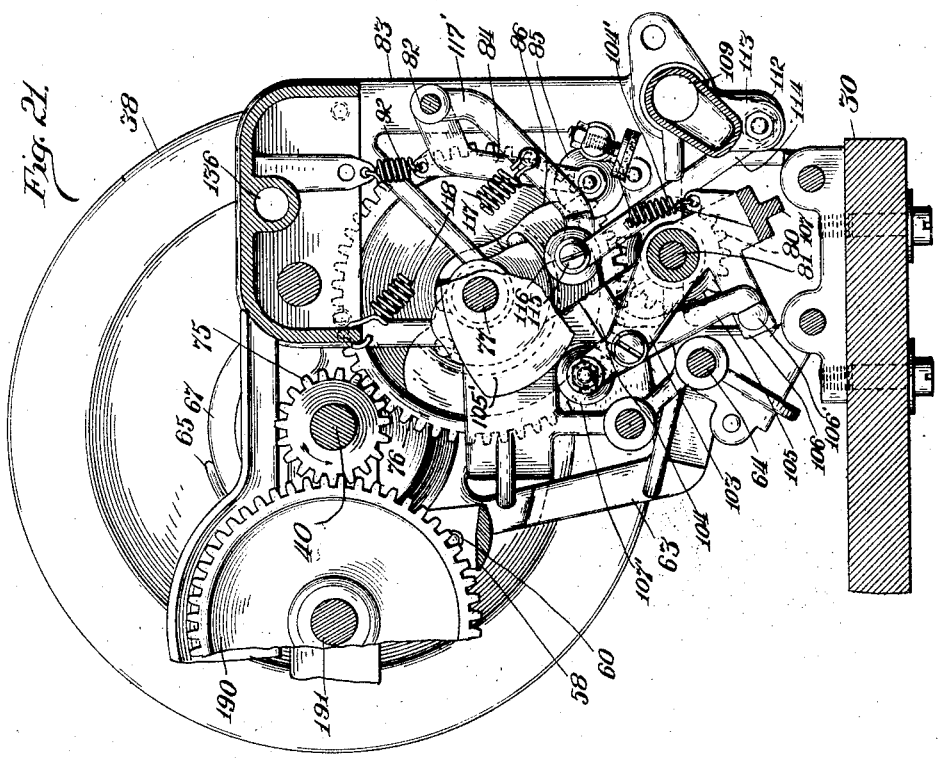
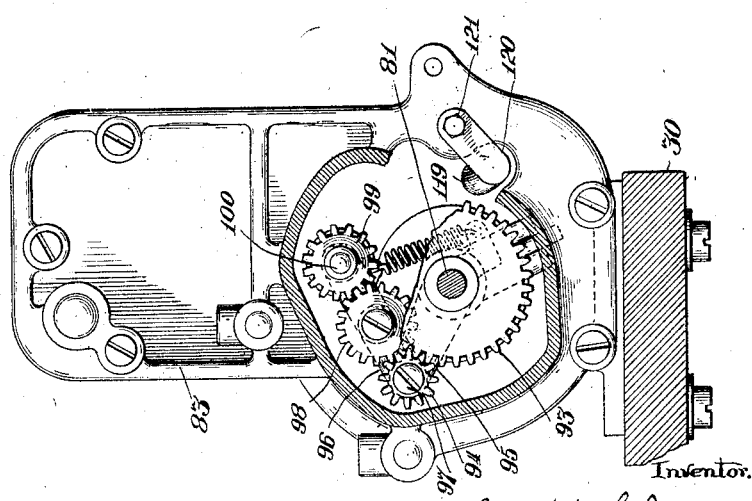

Patented Apr. 1, 1924.

1,488,667

UNITED STATES PATENT OFFICE.

JOSEPH S. DUNCAN, OF CHICAGO, ILLINOIS.

AUDITING MACHINE.

Application filed February 3, 1921. Serial No. 442,151.

*To all whom it may concern:*

Be it known that I, JOSEPH S. DUNCAN, a citizen of the United States, residing at Chicago, in the county of Cook and State of Illinois, have invented certain new and useful Improvements in Auditing Machines, of which the following is a specification.

This invention relates in general to printing machines and has more particular reference to machines of this character in which a plurality of different blanks, blank forms or documents are simultaneously fed to the machine for comparison and to receive certain printed impressions thereon.

In the selected embodiment herein shown and described, the primary object of this invention is to provide a machine for imprinting a facsimile signature on checks after each check and its corresponding record card have been passed before the operator for comparison.

Another important object is to provide means for stopping or starting the feed of either the checks or the record cards independently of the other to insure that the card and the check corresponding thereto are simultaneously presented to the printing mechanism.

Further objects are to provide means for imprinting on the card a number corresponding to the number of the check; to prevent access by unauthorized persons to the ink reservoir and the inking mechanism; to prevent operation of the machine by unauthorized persons; to provide means whereby the machine shall always stop in the same relative position of parts irrespective of the position of such parts at the time the stopping mechanism is operated; to avoid inking the printing cylinder where no blank is passing thereunder; to insure the operation of the numbering device only when a blank or form actually receives a number; to provide an accurate record of the actual number of times the printing or form cylinder has imprinted upon blanks or blank forms irrespective of the number of revolutions of such cylinder; to prevent contact of the impression cylinder and the platen when no blank or form is in place to receive an impression; and to provide an intermittent advance of the blanks or forms to the printing mechanism.

This machine in the selected embodiment is primarily intended for auditing purposes where a large number of checks are compared with the corresponding record card to insure that the check is correct before the signature is affixed thereto. The checks successively numbered and arranged are placed in a feed hopper and the record cards corresponding thereto are placed in a separate hopper in like order. Mechanism is provided to simultaneously feed a check and its corresponding record card.

The check and its corresponding card are moved preferably intermittently past the operator in parallel courses in full view so that as they approach the printing mechanism they may be carefully compared to insure that the names and amounts are correct. If the feeding mechanism should present a check or a card without the other, the advance of such check or card may be stopped readily until the corresponding card or check has been advanced to the same relative position in the machine whereupon the stop mechanism may be released and the check and card advanced together in parallel relation. Likewise should the operator note an error he may stop the entire feed until this error has been corrected.

A printing or form cylinder is provided having the form for the facsimile signature set longitudinally in the periphery thereof and beneath this cylinder is the rotary platen which is preferably so mounted that it will only be moved into operative relation with the printing cylinder when a blank is in position to receive an impression. A numbering device actuated by the printing mechanism is located above the path of the record card and means are provided to render this inoperative when no blank is received. A register is likewise operated by the printing mechanism to record the number of impressions actually made by the printing cylinder and this is so controlled that no record is made therein by the operation of the printing mechanism when no signature is affixed to a check.

It is often important in order to prevent fraudulent use of such a machine to provide a particular kind of ink and to prevent other than authorized persons having access to such ink. I have therefore provided a casing for the printing mechanism which may be securely locked. Also the inking mechanism is mounted on a separable frame so that when unlocked may be readily withdrawn for cleaning or to permit the same to be placed in a vault or other place of safe keeping for the purpose set forth.

In the drawings—

Fig. 1 is a plan view of the machine complete.

Fig. 2 is a front elevation.

Fig. 3 is an enlarged elevation of the receiving end of the machine.

Fig. 4 is a sectional view on the line 4—4 of Fig. 3.

Fig. 5 is a sectional view on the line 5—5 of Fig. 4.

Fig. 6 is a sectional view on the line 6—6 of Fig. 5.

Fig. 7 is a sectional view on line 7—7 of Fig. 6.

Fig. 8 is a sectional view on the line 8—8 of Fig. 6.

Figs. 9 and 10 are detail sectional views of the suction feeders in two positions.

Fig. 11 is a detail sectional view on the line 11—11 of Fig. 1.

Fig. 12 is a perspective view, partly broken away and in section.

Fig. 13 is a sectional view on line 13—13 of Fig. 1.

Fig. 14 is a sectional view on line 14—14 of Fig. 13.

Fig. 15 is a sectional view on the line 15—15 of Fig. 13.

Fig. 16 is a sectional view on line 16—16 of Fig. 13.

Fig. 17 is a sectional view on line 17—17 of Fig. 13.

Fig. 21 is a sectional view on line 21—21 of Fig. 3.

Fig. 22 is a sectional view on line 22—22 of Fig. 3.

Figure 18:
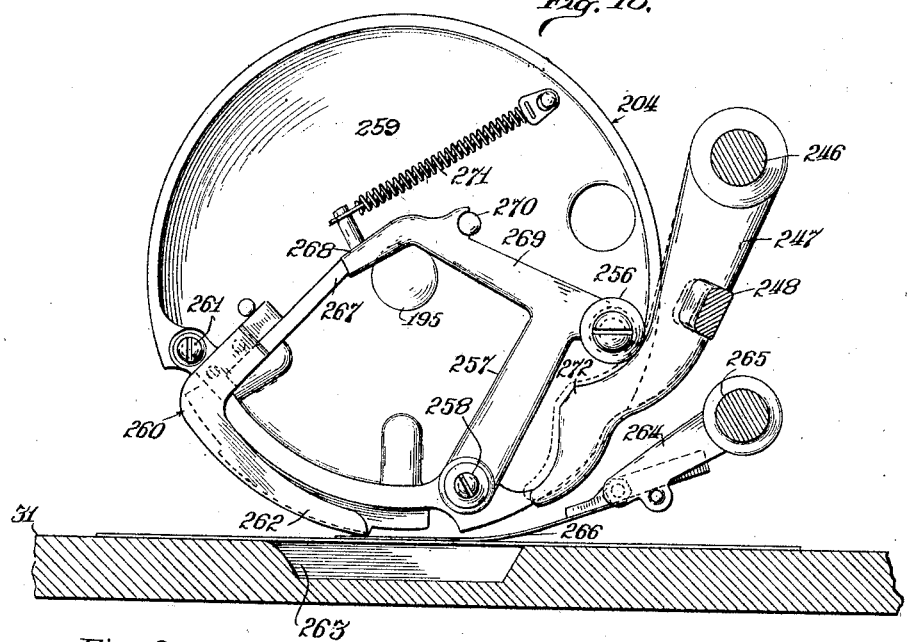
Figs. 18 and 19 are elevations, partly in section, showing the tripping mechanism.

The selected embodiment of the invention comprises a frame or support 30 on which is mounted a table 31. A motor 32 mounted in the support 30 drives pulley 33 on stud shaft 34, supported by the brace 35, through the medium of the belt 36. A small pulley 37 is secured upon the shaft 34 and this pulley drives the large pulley 38 by means of the belt 39. The pulley 38 is normally free upon the shaft 40 and is adapted to be locked thereon by the clutch 41 controlled by the plungers 42 and 43 mounted in the table 31.

The plunger 42 (Fig. 11) is connected to the slotted end 44' of the lever 44 mounted on the rock shaft 45. The arm 46 is likewise secured to this rock shaft and has its upper extremity pivotally connected to the operating rod 47. The lever 44 has an arm 48 projecting upwardly therefrom intermediate its ends. A spring 49 connects the plunger 42 with the lever 44. The plunger 43 is pivotally connected to the extremity 50 of the lever 51 which is pivoted intermediate its ends on the rock shaft 52 mounted in the upper extremity of the support 53. The free end 54 of the lever 51 is adapted to engage the upper extremity of the arm 48, when such arm is moved into the dotted position shown in Fig. 11, by the depression of the plunger 42, to hold the lever 44 depressed and the arm 46 correspondingly swung upon the rock shaft 45. When the plunger 42 is thus held in its depressed position, the rod 47 causes the clutch 41 to engage the pulley 38 and lock this pulley upon the driving shaft 40. The plunger 42 is released from its depressed position by depressing the plunger 43 which releases the extremity 54 of the lever 51 from the arm 48 and allows the plunger 42 to rise, releasing the rod 47. The rod 47 engages the lug 55 on the sleeve 56 revoluble upon the shaft 57 having one extremity mounted in the frame, best shown in Fig. 6.

An arm 58 (Figs. 6 and 8) projects from the sleeve 56 in substantially the opposite direction from the lug 55. The arm 58 then extends substantially parallel with the shaft 57 and has an inwardly turned lug or arm 59 formed on its outer extremity. This arm 59 is pivotally mounted on a stud shaft 60 in axial alignment with the shaft 57 and is provided with a cam slot 61 therein to receive the pin 62 on the arm 63. The arm 63 is pivotally mounted on the shaft 64 seated in the frame. A trip 65 is formed on the upper extremity of the arm 63 and engages the pawl 66 pivotally mounted on the disk 67. A spring 68 connects the inner end of the pawl 66 with the disk 67. A stud 69 projects inwardly from the hub of the pulley 38 and is adapted to be engaged by the pawl 66 to lock the pulley 38 upon the shaft 40. The pawl 66 is disengaged from the stud 69 by the trip 65 engaging its free end, in the manner shown in solid lines in Fig. 8, the locking shoulder 70 on the pawl being held out of engagement with such stud. Depression of the plunger 42 causes the arm 59 to be swung on its axis and the walls of the slot 61 acting on the pin 62 cause the arm 63 to be swung into the position indicated in dotted lines in Fig. 8 and thus disengage the trip 65 from the pawl 66 which is forced into engagement with the stud 69 by the spring 68.

In the present embodiment of the invention, the pulley 37 makes three revolutions to one of the shaft 40. A cam 71 mounted on the shaft 191 is adapted to engage a laterally projecting block 72 secured to the outer extremity of the arm 73 on the sleeve 56.

When the plunger 42 is depressed, this arm 73 is rotated into the position indicated in dot in Fig. 7 by the sleeve 56, and it can only be released from such position when the cutaway portion is opposite the block 72. The plunger 43 may be depressed at any time but the clutch will not release the pulley 38 and the machine will continue to operate until the arm 73 is released by the cam 71. This cam is preferably so formed that the pulley is released at the completion of a cycle of operation.

A pinion 75 (Fig. 21) is secured upon the shaft 40 and meshes with the gear 76 upon the cam shaft 77. This gear 76 meshes with a pinion 80 on the shaft 81. A shaft 82, best shown in Fig. 3, is mounted in the oppositely disposed side plates 83 and on one end of this shaft is secured an arm 84 carrying a cam roll 85 operated by the cam 86 on the cam shaft 77. A frame 89 secured upon the shaft 82 supports a plurality of retaining arms 90 adapted to have their lower extremities engage the forward faces of the foremost blanks in the blank supply holders 87 and 88 as indicated in Fig. 4 of the drawings. When the cam roll 85 is permitted to move inwardly toward the axis of the cam shaft 77 by the conformation of the cam 86, the spring 92 connecting this frame 89 with the main frame causes the arms 90 to swing rearwardly on their axes and to permit the forward blank to be withdrawn from the blank holder.

A gear 93, best shown in Fig. 22, on the opposite end of the shaft 81 from the gear 80 is in mesh with the pinion 94 carried by the arm 95 pivotally mounted on the shaft 81. An arm 96 has one extremity pivotally mounted on the stud bolt 97 which also carries the gear 94. An idler gear 98 carried by this arm 96 meshes with the gear 94 and a gear 99 on the shaft 100 supported by the outer extremity of the arm. A sleeve 101 (Figs. 4 and 5) is mounted upon the shaft 100 and a plurality of feed rolls 102 are formed on this sleeve. The opposite extremity of the shaft 100 is mounted in the outer extremity of the link formed by the arm 103 and one arm 104 of the bell crank 105. The inner extremity of the arm 103 is pivotally mounted on the shaft 81 in the same manner as the corresponding arm 95 on this shaft. The downwardly projecting arm 106 of the bell crank 105 has its lower extremity secured to the rod 106' mounted in the rocking frame 107. The movement of this shaft is controlled by the cam 105' on the cam shaft 77 through the medium of the cam roll 107' on the outer projection of the arm 103. The shaft 100 moves upwardly to raise the rolls 102 as the cam roll 107' moves toward the axis of the cam shaft 77 on the periphery of the cam 105'. The cam roll 107' is drawn toward the cam shaft by the spring 107" and the upper rolls 102 are drawn toward the lower or main rolls 134 on the shaft 81 by the spring 104' connecting the arm 104 with the frame 107.

The shaft 81 is provided with a plurality of large feed rolls 134, one being disposed opposite to each of the small feed rolls 102 on the reciprocating shaft 100. The small or upper feed rolls 102 are rocked forwardly and rearwardly over the periphery on the large rolls 134 by the action of the cam 105' and are raised slightly from such periphery as the blanks are fed between the rolls to facilitate the entrance of the blanks between the rolls. The rolls 102 then move toward the rolls 134 and firmly advance the blanks.

A plurality of suckers 108, best shown in Figs. 3, 9 and 10, are provided on the suction tube 109 which has its inner end 110 in engagement with the end 111 of the suction pipe 112. A lug 113 is formed on the end 110 of the suction tube 109 and this lug is pivotally connected to the lower extremity of the link 114 which has its upper extremity pivotally mounted on the stud bolt 115. The cam roll 116 likewise mounted on the stud bolt 115 engages the cam 117 on the cam shaft 77. The shaft 115 is connected to the shaft 82 by the link 117' which is supported by the spring 118 connected to the frame. The outer extremity 119 of the tube 109 is closed and this end is supported by the lug 120 pivotally mounted on the stud bolt 121 seated in the frame.

In the present embodiment three blank feeding suckers 108 have been provided, a group of two check suckers controlled by the plate 122, and a card sucker controlled by the plate 123. The card plate 122 is provided with slots 124 adjacent the opposite ends thereof through which pass stud screws 125, and the plate 123 likewise is provided with slots 126 and screws 127. The plate 122 has two upwardly projecting portions 128, each being adapted to close the mouth of its corresponding sucker when moved oppposite thereto. The slots 125 in the plate 122 are inclined upwardly and to the right as one faces the end of the machine as shown in Fig. 3, and the slots 126 are inclined upwardly and to the left when viewed from a similar position. The plate 123 is normally pressed downwardly and to the right by the spring 129 and the screws 127 coacting with the slots 126. Similarly the plate 122 is normally pressed downwardly and to the left by the spring 130. An arm 131 (Figs. 3 and 4) pivoted upon the pin 132 has its forward extremity 133 extending between the oppositely disposed inner ends of the plates 122 and 123. Movement of this arm against the plate 122 causes the plate to be moved upwardly and to the right with the upwardly projecting portions 128 over the mouth of the suckers as indicated in dot in Fig. 10. This renders the suckers inoperative. Similarly when arm 131 is moved against the plate 123 it causes the mouth of the corresponding sucker to be closed. This arm 131 is reciprocated by the control lever 166 best shown in Fig. 12.

In order to facilitate the withdrawal of the blanks from the supply hoppers, I have provided a pair of blowers 135 connected to the blower tube 136, one being disposed opposite to each of the hoppers, best shown in Figs. 3 and 4. The air for these blowers 135 is provided by the air pump 137 mounted in the lower portion of the frame or support 30 and operated by the belt 138 from the motor 32. This pump also provides the suction for the suckers described.

In the operation of the feed mechanism the upper feed roll shaft 100 is moved upwardly from the lower feed roll shaft 81 to space apart the rolls on these shafts. The retaining arms 90 swing upwardly and rearwardly from the position indicated in Fig. 4 to that indicated in Fig. 9. The suckers rise into the position indicated in Fig. 9 to engage the foremost blank in the pile in the hoppers. These suckers then swing rearwardly to bring the engaged blank into position to be grasped by the feed rollers 102 and 134. When the blank has been moved rearwardly by the suckers between the feed rolls, the upper feed rollers are lowered by the shaft 100 to press the blank against the feed rolls 134 and thus cause the blank to be advanced. During the downward movement of the rolls 102 the retaining arms 90 move into the relative position indicated in Fig. 10.

Oppositely disposed guides 140 and 141 (Fig. 4) receive the blanks as they are advanced by the feed rolls and conduct the same to the table 31 on the support 30. In the present embodiment there are two blank supply hoppers 87 and 88. The hopper 87 holds a supply of checks and the hopper 88 holds record cards corresponding to the checks in the hopper 87. A check and its corresponding card are fed to the machine simultaneously and are advanced along parallel courses 146 and 147 on the table 31 by endless tapes 150, 151, best shown in Fig. 1. The course 146 is provided with oppositely disposed guides 148 and the course 147 with similar guides 149. The tape 150 travels over pulley 152 and the tape 151 over pulley 154 on shaft 153. These tapes likewise travel over pulleys 155 and 156 respectively on shaft 157 at the receiving end of the table 31. A plurality of presser rolls 158 and 159 are disposed above the tapes to hold the blanks firmly thereon. A plurality of slots 160 are formed in the table 31 in the course 146 and in each of these slots operates a stop arm 161 pivotally mounted on the shaft 162. Similar slots 163 are disposed along the course 147 and through each of these operates a stop arm 164 mounted on the sleeve 165 revoluble on the shaft 162 (Fig. 12). The stops 161 and 164 may be manually operated by means of the lever 166 which likewise operates the arm 131 controlling the plates 122 and 123 controlling the suckers 108 in the manner described.

When this lever 166 is swung to the left, looking at it from the point of view of Fig. 12, the rod 167 causes a counter clockwise rotation of the rod 168 which swings the arms 169 secured thereon against the under faces of the plates 170 secured on the stop arms 161, raising these stops and preventing further advance of the blanks in the course 146. When the lever 166 is swung to the right the rod 168 rotates in a clockwise direction and causes the arms 171 thereon to engage the under faces of the stop arms 164 to raise these stop arms and prevent further progress of the blanks in the course 147. This lever 166 also controls the movement of the lever 131 so that feeding the blanks to the machine is stopped simultaneously with the interruption of the passage of the blanks on the face of the table. The stops 161 (Fig. 12) are normally reciprocated by the arm 172 secured to the shaft 162 and having at its upper extremity a cam roller 173 operatively engaging a cam 174 on the shaft 175. The stop arms 164 are similarly reciprocated by the arm 176 secured upon the sleeve 165 revoluble on the shaft 162 and having at its upper extremity a cam roller 177 upwardly engaging the cam 178 on the cam shaft 175. These stop arms cause an interrupted advance of the blanks in the courses although the feed tapes are continuously operating.

The printing mechanism is operated from the shaft 40 through the train of gearing (Figs. 1 and 5) comprising the pinion 75, the gear 190, the bevel gear 192, and the bevel gear 193 on shaft 175. At the opposite end of the shaft 175 from the bevel gear 193 is a similar bevel gear 194 operatively connecting this shaft with the main driving shaft 195 of the printing mechanism. A gear 196 (Fig. 13) is mounted on the driving shaft 195 and this gear is in mesh with the pinion 197 on the shaft 198 mounted in the bracket 199. A pulley 200 is likewise mounted on this shaft 198 and is provided with double peripheral grooves to receive and drive the round belts 201 and 202 which respectively drive the shafts 153 and 157 which operate the tapes 150 and 151. A printing cylinder 204 is mounted upon the driving shaft and this cylinder is disposed opposite to the platen 205 on the shaft 206. The shaft 206 (Figs. 16 and 17) is mounted in the upper extremity of the oppositely disposed arms 207 pivotally mounted on the shaft 208 supported by correspondingly opposed arms 209 on the shaft 210 mounted in lugs 211 on the support 30. The platen is adjusted to properly contact with the printing cylinder by the eccentric adjusting block 203 mounted on one of the lugs 211. An arm 212 is formed on the lower extremity of one of the arms 207 and projects at substantially a right angle to such arm. A rod 213 has its lower extremity pivotally mounted in the outer end of the arm 212 and its upper extremity passes through a perforation in the outer end of the arm 214 as indicated in Fig. 15. The arms 207 are connected by the cross brace 280 and on the upper extremity of one of these arms 207 is formed a shoulder 281, best shown in Fig. 17, which is engaged by the lower extremity of an arm 282 pivotally mounted upon the shaft 283 supported by the frame. The upper extremity 284 of this arm 282 engages the cam roller 285 mounted on the hub of gear 196. When this extremity 284 of the arm 282 is pressed outwardly from the axis of the shaft 195 by the cam roller 285, the lower extremity of this arm 282 causes the link support composed of the arms 207 and 208, with their respective shafts, to swing on the fixed pivot 207' of the links 500 extending the link support and raising the platen into operative relation with the impression cylinder 204. Raising the platen 205 lifts the hook 286 carried by the brace 280, best shown in Fig. 16, into position to be engaged by an oppositely disposed spring pressed hook 287 pivotally mounted on the printing cylinder 204 and such engagement occurs if no check is passing under the impression cylinder to maintain the hook 287 out of engagement. When the hooks 286 and 287 engage, the movement of the arms 207 and 208 is the reverse of the platen raising operation and the platen is caused to be depressed out of impression position and thus inking of the platen is prevented.

A cam 215 is mounted on the shaft 195 and this cam coacts with a cam roller 216 on the arm 214 which is pivotally mounted on the stud shaft 218. A spring 219 draws the arm 214 and the cam roller 216 thereon toward the axis of the shaft 195. This arm 214 rocks the arm 214' carrying the check feed roll 214'' in its outer extremity.

An ink reservoir 220 (Fig. 15) is provided in the separable frame 221 and an ink feed roll 222 is revolubly mounted therein. This ink feed roll 222 is provided with a ratchet 222' which is engaged by the pawl 223 pressed by the spring 224 against the arm 214, so that each reciprocation of the arm causes the roll 222 to be advanced the distance of one tooth. When an impression is made the rod 213 is raised by the movement of the links 207 and its upper extremity presses against the inner end of a rod 226 which has its outer extremity connected to the crank 227 operating a register 228 of the usual type to record the number of actual operations of the printing cylinder 204. A rod 229 has its inner extremity contacting with the rear face of the arm 214 and its outer extremity pivotally connected to the lug 230 projecting from the arm 231. This arm 231 is pivotally mounted on the rod 232 supported by the frame 221 and on the lower extremity of arm 231 is formed the roll 234 which is adapted to be reciprocated by the cam 216 to carry ink from the feed roll 222 to the roll 235. Ink is conveyed to the printing cylinder 204 through the train of ink rolls 222, 234, 235, 236, 237 and 238 and direct from the roll 235 to the roll 239. The frame 221 is mounted on the rod 233 which fits within this frame and such frame is held thereon by means of the nut 240 fitting on the end of the rod 233.

The entire printing mechanism is enclosed in a casing 241 which is hingedly mounted on the rod 242 (Fig. 15) supported in the frame 243 and this casing is provided with a key lock 244 which engages a lug 244' on the post 245 to secure the casing in its closed position. This lock is preferably of the spring type so that the cover is secured in place automatically as soon as it is lowered. In this way all the inking parts and the impression cylinder are securely enclosed and access thereto cannot be obtained by unauthorized persons.

Figures 19, 20:
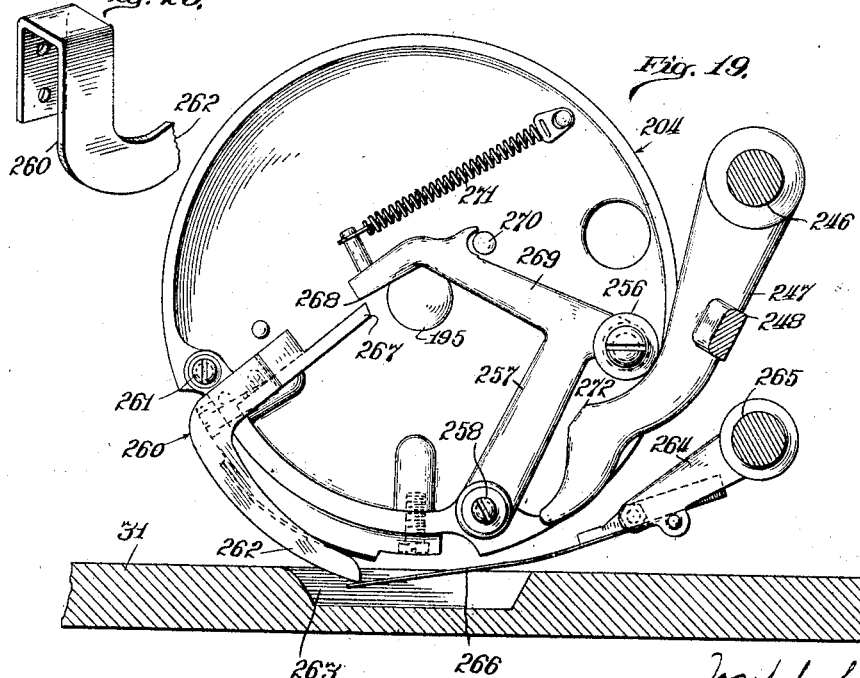
Fig. 20 is a perspective view of a part of the tripper.

A rod 246 (Fig. 15) is mounted in the frame 243 and on this rod is pivotally mounted an arm 247 (Figs. 18 and 19) from which projects laterally an arm 248 engaging a correspondingly laterally projecting arm 249 (Fig. 14) formed on the lower extremity of the arm 250 likewise pivotally mounted on the shaft 246. An arm 251 is formed on the upper pivoted extremity of the arm 250 and it projects rearwardly therefrom. A roller 252 is revolubly mounted on the pivot 253 in the outer extremity of arm 251 and this roller coacts with the upper extremity of a plunger 254 to actuate a consecutive numbering device 255 of the usual type. The arm 247 which operates the numbering device 255 (Fig. 14) is actuated by the cam roll 256 on the arm 257 pivotally mounted at 258 on the disk 259. A trip 260 (Figs. 18 and 19) is pivotally mounted on the disk 204 at 261. This trip is provided with a finger 262 which is adapted to enter the recess 263 beneath the disk when brought opposite thereto if no card is in position to receive an impression from the numbering device 255. An arm 264 is mounted on the shaft 265 and at the outer extremity of such arm 264 is pivotally mounted a thin flat metal strip 266 on which the finger 262 of the trip 260 is adapted to ride as it passes over the recess 263. When a card is beneath the trip 260 in the course 147, the strip 266 is supported thereby which causes the outer end 267 of the trip to swing into engagement with the outer extremity 268 of the inwardly projecting portion 269 of the arm 257 in the manner shown in Fig. 18 of the drawing. This rigidly holds the cam roller 256 in the position indicated in that figure. A pin 270 projects outwardly from the face of the disk 259 and limits the swinging of the arm 257 in a clockwise direction. The arm 257 is normally held in contact with this pin 270 by the spring 271 so that the cam roll 256 is maintained in its outermost position. A cam 272 is formed on the inner face of the lower extremity of the arm 247 and this cam engages the cam roll 256 when this roll is rotated by the disk to the position indicated in Fig. 18. The arm 257 cannot swing inwardly when engaged by the arm 267 and therefore the arm 247 is forced outwardly, actuating the numbering device 255 in the manner described. If no card is in position beneath the disk 259 the strip 266 will not be supported and will therefore drop downwardly as indicated in Fig. 19. This permits the trip 260 to swing outwardly on its pivot 261 into the position indicated with the upper extremity 267 out of engagement with the end 268 of the arm 257. The arm 257 may now yield when the roller 256 engages the cam 272, and the roller rides over the cam without swinging the arm 247 and no actuation of the numbering device takes place.

Hoppers 285 and 286 (Fig. 2) corresponding to the hoppers 87 and 88 are yieldingly mounted on the arms 287 and 288 respectively at the discharge end of the machine to receive the checks and cards after these have passed through the printing mechanism.

The tape 150 (Fig. 15) which conducts the check from the feed mechanism to the printing mechanism and then to hopper 285 passes over the pulley 152, about the idlers 289 and 290 and over the supporting roll 291 before returning to the pulley 155 previously described. The idler 289 is adjusted by the tension screw 293 to properly tension the tape. The tape 151 (Fig. 14) passes about the idlers 294, 295, 296 and 297 before reaching the pulley 154 in order that it may not interfere with the support 298 beneath the numbering device 255.

It will thus be seen that the checks and record cards are removed from their respective hoppers by the suckers and carried between the feed rolls which are spaced to receive them but which rock together to firmly grip and advance them between guide fingers to the top face of the table. The check and its corresponding record card are then conducted side by side along parallel courses on this table to the printing mechanism. The conducting tapes operate continuously but the forward motion of the card and check are simultaneously interrupted at regular intervals while the printing operation is being performed upon a preceding pair and thus ample opportunity is given for the operator to carefully compare the names and amounts on the check and card to see that they are correct. If an error should be noted, the advance of the blanks in either course or the entire mechanism may be stopped readily in the manner described until such error has been corrected. This is particularly useful in case the check and its corresponding card are not fed simultaneously for it permits the operator to stop the advance of the first to arrive in order to allow the other to reach the same stage and then to permit them to advance together in the proper manner. This manual control for the stopping mechanism is independent of the intermittent interruption of the advance of the card and the check which is automatic and occurs in both courses simultaneously. The checks and cards are maintained in contact with their respective feeding tapes by means of weighted rollers or other suitable means disposed above the tapes. The card and its corresponding check are then fed to the printing mechanism which prints a facsimile signature upon the check and a number on the record card corresponding to the number on the check. The register keeps a record of the number of checks signed.

If no check is fed to the printing mechanism the platen remains out of impression position. Similarly the numbering device and the register are not operated when no card or check passes through the printing mechanism although the driving shaft, impression cylinder and the the platen continue to revolve.

The check and the record card corresponding thereto are deposited in the receiving hoppers after passing through the printing mechanism in the exact order in which they were placed in the supply hoppers at the opposite end of the machine.

While the machine is intended to be run by motor or other source of power the same may be manually operated and a handle 300 (Fig. 3) on the pulley 38 is provided for this purpose. When operating the machine manually the belt 39 should be disengaged from the pulley 38.

This machine has been described as used for the comparing of record cards with their corresponding checks and for affixing a facsimile signature on such checks, but it will be readily appreciated that it is adapted for a very much larger field of use.

While I have particularly shown and described a machine which has been satisfactorily used and demonstrated its efficiency, I reserve the right to make all changes, modifications and alterations therein which may be desirable to satisfy different requirements within the scope of the following claims.

I claim:

1. In a machine, in the class described, a support, printing mechanism thereon, a plurality of separate courses leading to said printing mechanism, means for simultaneously feeding a series of blanks along said courses to said printing mechanism, and means for stopping said blanks in selected positions before they reach said printing mechanism.

2. In a machine, in the class described, a support, printing mechanism thereon, a plurality of separate courses leading to said printing mechanism, means for simultaneously feeding a series of blanks along said courses to said printing mechanism, and means for checking the motion of the blanks in the separate courses independently.

3. In a machine, of the class described, feeding mechanism, printing mechanism, actuating means for said mechanisms, a source of power, means to connect said actuating means with said source of power for continuous operation through a plurality of cycles of operations, and means to prevent disconnection of said means from said source of power during a cycle of operations.

4. In a machine, of the class described, feeding mechanism, printing mechanism, means for continuously actuating said mechanisms through a plurality of cycles of operations, means to start and stop said actuating means, and means to prevent the stopping of said actuating means between the initiation and the completion of a cycle of operations.

5. In a machine of the class described, a table, a plurality of hoppers adjacent to said table, printing mechanism adjacent to said table, means for simultaneously feeding upon said table a blank from each of said hoppers, means for simultaneously advancing said blanks in parallel relation along the top of said table to said printing mechanism, and means for selectively stopping the feed and advance of said blanks.

6. In a machine, of the class described, feeding mechanism, printing mechanism, actuating means for said mechanisms, a continuously rotating shaft, means to effect a driving engagement between said actuating means and said shaft, manually operable means for disengaging said actuating means and said shaft, and means to prevent disengagement of said actuating means and said shaft between the beginning and ending of a cycle of operations.

7. In a machine of the class described, a table, a plurality of hoppers adjacent to said table, printing mechanism on said table, means for simultaneously feeding a blank upon said table from each of said hoppers, means for advancing said blanks by an interrupted movement along parallel courses to said printing mechanism, and selective means for stopping the advance of said blanks during such movement.

8. In a machine, of the class described, feeding mechanism, printing mechanism, actuating means for said mechanisms through a plurality of cycles of operations, manually controlled means for stopping said actuating means, means to set said actuating means in motion and means to prevent stopping of said actuating means until a cycle of operations is completed.

9. In a machine of the class described, feeding mechanism, printing mechanism, actuating means for said mechanisms, and means for controlling said actuating means including a manually operated plunger, a driving shaft, a driven shaft, a clutch member upon said driving shaft, means on said driven shaft for engaging said clutch member to lock said shafts together, and actuating means connecting said plunger and said locking means.

10. In a machine of the class described, feeding mechanism, printing mechanism, actuating means for said mechanisms, and means for controlling said actuating means including a manually operated stop plunger, a driving shaft, a driven shaft, a clutch member upon said driving shaft, means on said driven shaft engaging said clutch member to lock said shafts together, and means for controlling said locking means whereby said shafts shall remain in locking engagement until the completion of the cycle of operations in which said plunger is operated.

11. In a machine of the class described, feeding mechanism, printing mechanism, actuating means for said mechanisms including a driving shaft, a driven shaft, a clutch operatively connecting said shafts, and controlling means for said clutch including a clutch operating arm, a stop plunger, means operatively connecting said arm and said plunger, and a cam coacting with said arm to maintain the same out of operative engagement with the clutch until the completion of the cycle of operations of said mechanisms in which said plunger is operated.

12. In a machine of the class described, feeding mechanism, printing mechanism, actuating means for said mechanisms including a driving shaft, a driven shaft, a clutch member upon said driving shaft, a starting plunger, means controlled by said plunger for engaging said clutch member to lock said shafts together, a stop plunger, means controlled by said stop plunger for moving said locking means out of engagement with said member, a cam, and means controlled by said cam for retaining said locking means in engagement with said member until the completion of the cycle of operations of said mechanisms in which said stop plunger is operated.

13. In a machine of the class described, a table, means for feeding a plurality of blanks upon said table simultaneously, printing mechanism on said table, means for advancing each of said blanks by a separate course to said printing mechanism, said printing mechanism including a revoluble printing cylinder disposed above one of said courses, a platen disposed opposite to said cylinder and normally out of operative relation therewith, and means operated by the revolution of said cylinder for moving said platen into operative relation with said cylinder when a blank is in position to receive an impression.

14. In a machine of the class described, a table, means for simultaneously feeding a plurality of blanks upon said table, a printing mechanism on said table, and means for conducting each of said blanks by a separate course to said printing mechanism, said mechanism including a revoluble printing cylinder disposed in operative relation to one of said courses, and means for recording the number of impressions made by said cylinder on the blanks.

15. In a machine of the class described, a table, means for simultaneously feeding a plurality of blanks upon said table, a printing mechanism on said table, and means for conducting each of said blanks by a separate course to said printing mechanism, said mechanism including a revoluble printing cylinder disposed in operative relation to one of said courses, a platen disposed opposite said cylinder, and a numbering machine disposed opposite to another of said courses and operating upon the blank therein when the impression cylinder is operating upon the blank in its course.

16. In a machine of the class described, a table, means for feeding blanks upon said table, a printing mechanism on said table, means for conducting said blanks to said printing mechanism by a plurality of different courses, said printing mechanism comprising a printing cylinder disposed in operative relation to one of said courses, a numbering machine disposed in operative relation with another of said course, actuating means for said cylinder, and means actuating said numbering machine when a blank is in position relative thereto but remaining inoperative when no blanks is presented in such position by said conducting means.

17. In a machine of the class described, blank feeding mechanism, printing mechanism spaced from said feeding mechanism, an inspection table interposed between said mechanisms, and means for advancing blanks from said feeding mechanism to said printing mechanism across the face of said inspection table.

18. In a machine of the class described, blank feeding mechanism, printing mechanism spaced from said feeding mechanism, an inspection table interposed between said mechanisms, and means for moving blanks from said feeding mechanism to said printing mechanism over said inspection table by an interrupted advance.

19. In a machine of the class described, blank feeding mechanism, printing mechanism spaced from said feeding mechanism, an inspection table, means for simultaneously advancing a plurality of blanks from said feeding mechanism to said printing mechanism along separate courses on said table, and selective means for stopping the advance of said blanks in any one of said courses.

20. In a machine of the class described, blank feeding mechanism, printing mechanism spaced from said feeding mechanism, an inspection table interposed between said mechanisms, means for simultaneously moving a plurality of blanks from said feeding mechanism to said printing mechanism along separate courses on said table by an interrupted advance, and means for selectively stopping the advance of the blanks in any one of said courses.

21. In a machine of the class described, blank feeding mechanism, printing mechanism spaced from said feeding mechanism, an inspection table interposed between said mechanisms, means for simultaneously moving a plurality of blanks from said feeding mechanism to said printing mechanism over said table in separate courses, cam controlling means for interrupting the advance of said blanks in said courses, and manually operated means for selectively stopping said blanks in any one of said courses during said advance.

22. In a machine of the class described, blank feeding mechanism, printing mechanism spaced from said feeding mechanism, an inspection table interposed between said mechanisms, guides disposed on said table to form a plurality of separate parallel blank conducting courses between said mechanisms, and means for advancing the blanks in each of said courses.

23. In a machine of the class described, blank feeding mechanism, printing mechanism spaced from said feeding mechanism, an inspection table interposed between said mechanisms, guides disposed on said table to form a plurality of separate blank conducting courses between said mechanisms, means for advancing the blanks in each of said courses, and stops disposed at intervals along each of said courses to interrupt the advance of the blanks therein.

24. In a machine of the class described, blank feeding mechanism, printing mechanism spaced from said feeding mechanism, an inspection table interposed between said mechanisms, guides disposed on said table to form a plurality of separate blank conducting courses between said mechanisms, a plurality of reciprocating stop arms projecting through said table in said courses to interrupt the advance of the blanks therein, and actuating means for said arms.

25. In a machine of the class described, blank feeding mechanism, printing mechanism spaced from said feeding mechanism, an inspection table interposed between said mechanisms, guides disposed on said table to form a plurality of separate blank conducting courses between said mechanisms, and means for selectively controlling the feeding of blanks to said courses.

26. In a machine of the class described, blank feeding mechanism, printing mechanism spaced from said feeding mechanism, an inspection table interposed between said mechanisms, guides disposed on said table to form a plurality of separate blank conducting courses between said mechanisms, and means for selectively controlling the feeding of blanks to any one of said courses and the advance of the blanks therein.

27. In a machine of the class described, feeding mechanism, printing mechanism, an inspection table interposed between said mechanisms, guides disposed on said table to form a plurality of separate blank conducting courses, blank feeding tapes continuously operating in each of said courses to advance the blanks therein, and cam actuated stop arms adapted to project through said table to periodically interrupt the advance of the blanks in said courses.

28. In a machine of the class described, feeding mechanism, printing mechanism, an inspection table interposed between said mechanisms, guides disposed on said table to form a plurality of separate blank conducting courses, blank feeding tapes continuously operating in each of said courses to advance the blanks therein, cam actuated stop arms adapted to project through said table to periodically interrupt the advance of the blanks in said courses, and means for selectively operating the arms in any one of said courses independently of the cam actuating means.

29. In a machine of the class described, the combination of a table, a pair of hoppers at one end of said table, means for feeding blanks from said hoppers simultaneously, printing mechanism at the other end of said table, means for moving said blanks side by side in separate courses from the feeding mechanism to the printing mechanism, and means for stopping the movement of the blanks in either or both of said courses.

30. In a machine of the class described, the combination of a table, a pair of hoppers at one end of said table, means for feeding blanks from said hoppers simultaneously, printing mechanism at the other end of said table, means for intermittently moving said blanks side by side in separate courses from the feeding mechanism to the printing mechanism, and means for stopping the movement of the blanks in either or both of said courses.

31. In a machine of the class described, a support, and a printing mechanism mounted on said support including a revoluble printing cylinder, a platen in operative relation to said cylinder, an ink reservoir, an ink feed roll operatively mounted in said reservoir, a printing cylinder inking roll, means for intermittently conveying ink from said feed roll to said inking roll and means operating said last named means at predetermined intervals in the operation of the printing mechanism.

32. In a machine of the class described, a frame, a printing couple adapted to move into and out of operative engagement and including a rotatable printing cylinder, a numbering device rigidly mounted upon the frame and adapted to operate correspondingly with the printing couple, sheet controlled means carried by the rotatable cylinder for governing the operation of the printing couple, and sheet controlled means carried by the rotatable cylinder for governing the operation of the numbering device.

33. In a machine, of the class described, a printing couple including a rotatable printing cylinder and a rotatable platen, means for movably supporting said platen, means operated by the rotation of the printing cylinder for moving said platen into operative engagement with said printing cylinder, a register for indicating the number of impressions made, and means operated by the movement of said platen for operating said register.

34. In a machine, of the class described, a printing couple including a rotating printing cylinder and a rotating platen, rocking arms supporting the platen and movably to carry the platen into and out of operative engagement with the printing cylinder, a register for indicating the number of impressions made, means driven with the rotation of the printing cylinder for operating said register, and means connected with said rocking arms for rendering the last named means operative only when the platen is in position to make an impression.

35. In a machine, of the class described, a printing couple including a rotating cylinder and a rotating platen, rocking arms for moving said platen into and out of impression position, means operated by the rotation of the printing cylinder for operating said rocking arms, a register for indicating the number of impressions made, means driven from the rotation of the printing cylinder for operating said register, a rod connected with said rocking arms and movably therewith to make said last mentioned means effective only when an impression is made, and sheet controlled means for moving the platen out of impression position when no sheet is presented at the proper time.

36. In a machine of the class described, a frame, a printing couple adapted to move into and out of operative engagement and including a rotatable printing cylinder, a numbering device rigidly mounted upon the frame and adapted to operate correspondingly with the printing couple, an independent platen for said numbering device, the independent platen being rigidly mounted upon the frame, sheet controlled means carried by the rotatable cylinder for governing the operation of the printing couple, and sheet controlled means carried by the rotatable cylinder for governing the operation of the numbering device.

37. In a machine of the class described, a frame, a printing couple adapted to move into and out of operative engagement and including a rotatable cylinder and a rotatable platen, a numbering device rigidly mounted upon the frame and adapted to operate concurrently with said printing couple, a stationary platen for the numbering device, means for moving said printing couple out of operative engagement when no sheet is presented at the proper time, and sheet controlled means carried by the rotatable cylinder for operating the numbering device.

38. In a machine, of the class described, a printing couple, a numbering device adapted to operate concurrently with said printing couple, said numbering device being immovably secured as a unit with respect to the printing couple, means rotating with an element of said printing couple for operating said numbering device, and sheet controlled means for rendering said last named means ineffective when no sheet is fed at the proper time.

39. In a machine, of the class described, a printing couple including a rotating printing cylinder and a rotating platen, means for moving said printing cylinder and platen into and out of operative engagement, a numbering device immovably secured as a unit with respect to the printing couple, means rotating with said printing cylinder for operating said numbering device, and sheet controlled means for rendering said last named device effective.

40. In a machine, of the class described, a printing couple including a rotating element, a numbering device for operating concurrently with said printing couple, rocking means mounted on said rotating element for operating said numbering device, and sheet controlled means for rendering said rocking means effective.

41. In a machine, of the class described, a printing couple including a rotating element, a numbering device adapted to operate concurrently with said printing couple, a pivoted member carried by said rotating element and adapted to operate said numbering device, and a second pivoted member carried by said rotating element and adapted to limit the movement of said first pivoted member when a sheet is fed at the proper time.

42. In a machine, of the class described, a printing couple including a rotating element, a numbering device adapted to operate concurrently with said printing couple, a pivoted arm on said rotating element adapted to operate said numbering device, a trip carried by said rotating element adapted to secure said arm in operative position, and sheet controlled means for operating said trip.

43. In a machine, of the class described, a printing couple, means for feeding blanks to said couple, a registering device for indicating the number of impressions made by said printing couple, the registering device being immovably secured as a unit with respect to the printing couple, means for operating said registering device, and means dependent upon the presence of a blank at the printing couple for controlling the last named means.

44. In a machine of the class described, a printing cylinder, a platen adapted to move into and out of operative engagement with said cylinder, a register for indicating the number of impressions made, said register being immovably secured as a unit with respect to said printing couple, means driven with the cylinder for operating said register, and means moving with the platen for rendering the last named means effective only when the platen is in operative engagement with the cylinder.

45. In a machine of the class described, a printing form, a platen to move into and out of engagement with said form, toggles for moving said platen into and out of engagement with said form, a register for indicating the number of impressions made, and means operated by the toggles for rendering the last named means effective only when the platen is in operative engagement with said form.

46. In a machine of the class described, a printing couple including a rotary element, means for moving said printing couple into and out of operative engagement, a numbering device, means for operating said numbering device, means rotating in unison with said rotating element for intermittently actuating said last mentioned means, and sheet controlled means for controlling said means rotating in unison with said rotating element.

47. In a machine of the class described, a printing couple including a rotary element, means for moving said printing couple into and out of operative engagement, a numbering device, means for operating said numbering device, means carried by said rotating element for intermittently actuating said last mentioned means, and sheet controlled means for controlling said means carried by said rotating element.

48. In a machine of the class described, a printing couple including a rotary element, means for moving said printing couple into and out of operative engagement, a numbering device, means for operating said numbering device, means pivotally secured to said rotating element for intermittently actuating said last mentioned means, and sheet controlled means for controlling said means pivotally secured to said rotating element.

49. In a machine of the class described, a frame, a printing couple including a rotary element, means for moving said printing couple into and out of operative engagement, a numbering device affixed as a unit with respect to said frame, means for operating said numbering device, means rotating in unison with said rotary element for intermittently actuating said last mentioned means, and sheet controlled means for controlling said means rotating in unison with said rotating element.

50. In a machine of the class described, a printing couple including a rotating cylinder and a rotating platen, means for moving said platen into and out of operative engagement, a numbering device adapted to operate correspondingly with the printing couple, an immovable platen for said numbering device, and sheet controlled means for governing the operation of said printing couple and said numbering device.

51. In a machine of the class described, feeding mechanism, printing mechanism, actuating means for said mechanisms, a source of power, manually controlled means to connect said actuating means with said source of power for continuous operation through an indefinite number of cycles of operations, and manually controlled means settable during a cycle of operations for disconnecting said actuating means from said source of power at the completion of said cycle of operations.

52. In a machine of the class described, feeding mechanism, printing mechanism, actuating means for said mechanisms, a source of power, manually controlled means to connect said actuating means with said source of power for continuous operation through an indefinite number of cycles of operations, manually controlled means settable during a cycle of operations for disconnecting said actuating means from said source of power at the completion of said cycle of operations, and means for preventing disconnection of said actuating means from said source of power during said cycle of operations.

53. In a machine of the class described, a frame, a rotatable printing form, a rotatable platen adapted to move into and out of operative engagement with said form, a register rigidly secured to the frame for indicating the number of impressions made, and means controlled by the movement of said platen for operating said register.

JOSEPH S. DUNCAN.